INVENTOR
J.T. KARBOSKY
BY
Young & Quigg
ATTORNEYS

3,345,827
METHOD AND APPARATUS FOR CONTROLLING THE TEMPERATURE OF A FLUID REMOVED FROM A SOURCE THEREOF
Joseph T. Karbosky, Bartlesville, Okla., assignor to Phillips Petroleum Company, a corporation of Delaware
Continuation of application Ser. No. 454,279, May 10, 1965. This application Aug. 19, 1966, Ser. No. 573,719
10 Claims. (Cl. 62—55)

This application is a continuation of Ser. No. 454,279 filed May 10, 1965.

This invention relates to a method and apparatus for controlling the temperature of a fluid removed from a source thereof.

Although this invention will be described, for the sake of clarity, relative to liquefied gas such as propane, it is to be understood that the invention applies generally to fluids.

In the removal of liquefied gas from a storage zone to a transportation means such as a tanker ship, railroad car, pipe line, and the like, the liquefied gas must be heated since the transportation means is generally not constructed of a material which can tolerate temperatures as low as those at which liquefied gas is normally stored. To effect this heating, the liquefied gas after removal from the storage zone is passed through a heat exchanger.

Heretofore, problems have been encountered in finding a system of controls which is completely reliable and yet sufficiently simple in content to be practical. To obtain the degree of dependability desired, it has generally been thought that complex controls and even more complex interrelation of these controls was necessary. However, as complexity increases, dependability, to a certain degree, and practicality vary inversely therefrom.

It has now been found that by the proper placement of simple temperature sensing and flow sensing devices along the line of flow of fluid from the storage zone, and with the proper interrelation of these devices with the pumping means used to remove this fluid from the storage zone, a reliable yet simple and practical system of temperature control is effected.

Accordingly, it is an object of this invention to provide a new and improved method for controlling the temperature of a fluid removed from a source thereof. Another object of this invention is to provide new and improved apparatus for controlling the temperature of the fluid removed from the source thereof.

Other aspects, objects and the several advantages of the invention will be apparent to those skilled in the art from the description, the drawings and the appended claims.

Figure 1:
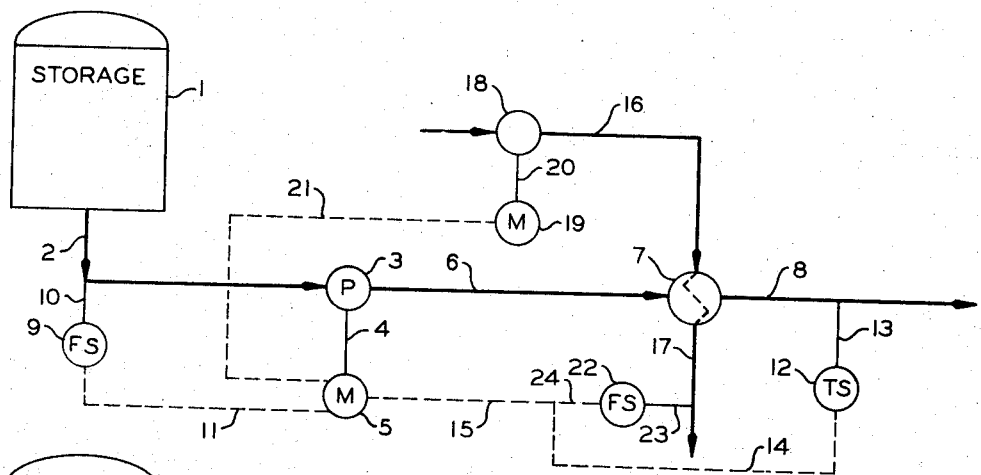
FIGURE 1 shows diagrammatically the system embodying one aspect of this invention.

In FIGURE 1 liquefied gas is stored in storage zone 1 and removed therefrom through conduit 2 by pump 3 which is in turn driven through 4 by motor 5. The liquefied gas passes from pump 3 through conduit 6, through heat exchanger 7 and through conduit 8 to suitable transportation means or other storage zone as desired. The liquefied gas in conduit 6 is heated by heat exchanger 7 to a temperature at least above that temperature at which the transportation or storage means at the end of conduit 8 can be relied upon to hold the liquefied gas for a substantial length of time without becoming embrittled, cracked, or otherwise deteriorating. For example, propane is normally stored at about −50° F. but must be heated to about 20° F. before being loaded into a conventional tanker ship.

In order to insure that the temperature of the liquefied gas in conduit 8 meets or exceeds the desired temperature for transportation thereof, a temperature sensing means 12 is operatively connected to conduit 8 by conduit 13 and to motor 5 by electrical circuit conduits 14 and 15 to stop motor 5 if the desired temperature is not attained. A flow sensing means 9 is operatively connected to conduit 2 by 10 and to motor 5 by 11 to stop motor 5 if flow through line 2 should decrease below a predetermined value.

Thus, if the flow in conduit 2 falls below a predetermined value determined as minimum for prevention of the overheating of motor 5, flow sensor 9 will slow down or terminate the operation of motor 5 and therefore pump 3. Also, if desired the flow sensor or another flow sensor can be employed to slow down or terminate operation of motor 5 if the flow in conduit 2 exceeds a maximum value and risks freezing up of heat exchanger 7. Similarly, if the temperature of the liquefied gas in conduit 8 should fall below a predetermined minimum value, temperature sensor 12 will slow down or terminate the operation of motor 5 and therefore pump 3, thus restricting the flow of liquefied gas from storage zone 1 through heat exchanger 7.

Heating medium passes into heat exchanger 7 from conduit 16 and exits therefrom by conduit 17. Pump 18 moves hot heating medium through conduit 16 by the action of motor 19 through shaft 20. Motor 19 is interconnected with motor 5 by 21 in a manner known in the art so that motor 5 cannot be started without first starting motor 19. Thus, propane cannot be removed from storage zone 1 without first starting the circulation of heating medium through heat exchanger 7 thereby ensuring that liquefied gas from storage zone 1 will not pass into conduit 8 without first being heated in heat exchanger 7. A conventional torque switch, electrical relay and the like, can be operatively connected to motor 19 in a manner to open a switch and terminate the operation of motor 5 when motor 19 slows below a predetermined value or stops. Flow sensing means 22 is operatively connected to heating means outlet conduit 17 by 23 and by 24 and 15 to motor 5. Thus, if the flow rate of the heating medium in conduit 17 falls below the value predetermined to be the minimum at which the liquefied gas can pass through heat exchanger 7 and still be heated to the desired temperature, flow sensor 22 will slow down or stop motor 5, thus decreasing or terminating the amount of liquefied gas passing through heat exchanger 7 to be heated thereby.

It should be noted that instead of utilizing the above-described apparatus to maintain the liquefied gas in conduit 8 above a predetermined minimum temperature, this same apparatus can be adjusted so as to prevent the same liquefied gas from exceeding a predetermined maximum temperature. This apparatus can also be adjusted so as to maintain the liquefied gas in conduit 8 both above a minimum temperature and below a maximum temperature.

A sufficiently reliable yet simple control system can be effected if the interconnection 21 between motors 5 and 19 is omitted and the use of flow sensor 22 is also omitted. There is thus left flow sensor 9 and temperature sensor 12 each operatively connected to motor 5 and to conduits 2 and 8, respectively. In this modification, flow sensor 9 and temperature sensor 12 operate in the same manner as described above to slow down or terminate the operation of motor 5.

The heating fluid utilized in heat exchanger 7 can be any conventional material such as fresh water, salt water, ethylene glycol, mixtures thereof and the like. This embodiment is particularly adaptable to high speed loading of pipe lines.

Figure 2:
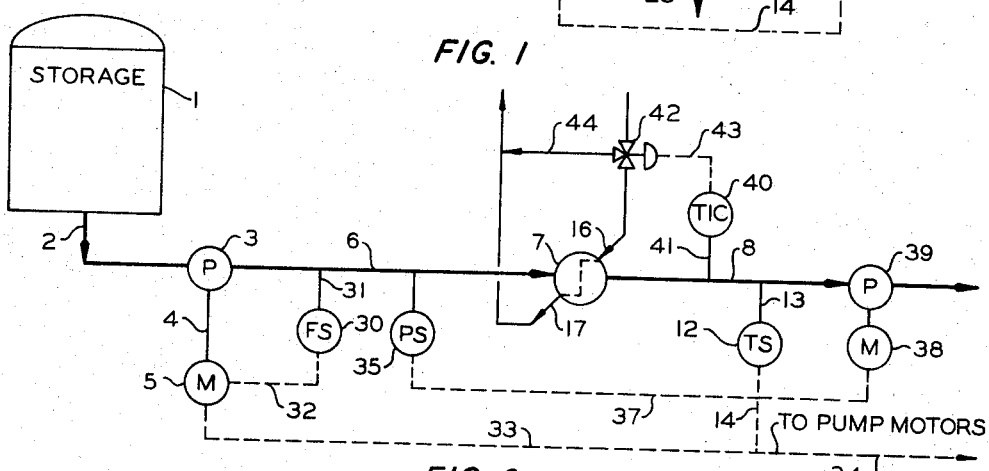
FIGURE 2 shows diagrammatically another system embodying an aspect of this invention.

FIGURE 2 shows the modification of the embodiment of FIGURE 1 in which interconnection 21 and flow sensor 22 are omitted and flow sensor 9 is replaced by flow sensor 30 which is located downstream from pump 3 and is operatively connected to conduit 6 by 31 and motor 5 by 32. Also, temperature sensor 12 is connected to motor 5 by 14 and 33. If desired, temperature sensor 12 can be connected to other pump motors or motivating means downstream therefrom by 14 and 34, e.g., pump motors in the pipe line into which conduit 8 deposits its liquefied gas contents. Further, pressure sensor 35 is operatively connected by conduit 36 to conduit 6 and by electrical conduit 37 to motor 38 which runs pump 39 so that if the pressure falls below or exceeds predetermined values pressure sensor 35 will at least slow down, preferably terminate, the operation of pump 39. The termination of operation of pump 39 then decreases flow in 6 which is sensed by flow sensor 30 which in turn slows or terminates operation of pump 3.

Temperature sensor 12 operates to slow down or terminate the operation of motor 5 in the same manner as described above. Flow sensor 30 operates to slow down or terminate the operation of motor 5 in the same manner as described above with respect to flow sensor 9.

A temperature controller 40 is operatively connected to conduit 8 by conduit 41 and to three-way motor valve 42 in conduit 16 by electrical conduit 43. Conduit 44 connects valve 42 and conduit 17 so that when the temperature of the material in 8 exceeds a predetermined maximum value at least part of the heating fluid in 16 is bypassed through 44 into 17.

It should be noted that two or more pumps similar to pump 3 can be employed in series or in parallel with pump 3. If multiple pumps are employed in parallel, separate flow sensors similar to flow sensor 30 can be employed downstream from each pump or at least one of the flow sensors for at least one of the pumps can be employed downstream of the pumps at a point where the discharge from all the pumps is again joined into a single stream to be passed through heat exchanger 7.

It should be noted that the desired temperature of the liquefied gas in conduit 8 will vary widely depending upon the type of liquefied gas present and the transportation or other receiving means connected to conduit 8. For example, in the case of liquefied propane, the temperature in conduit 8 should be no lower than 35° F. if conduit 8 is emptying into a pipe line, a use for which this embodiment is preferred. However, if conduit 8 is emptying into a tanker ship, the temperature can be as low as, but is preferably no lower than, 15° F.

Figure 3:
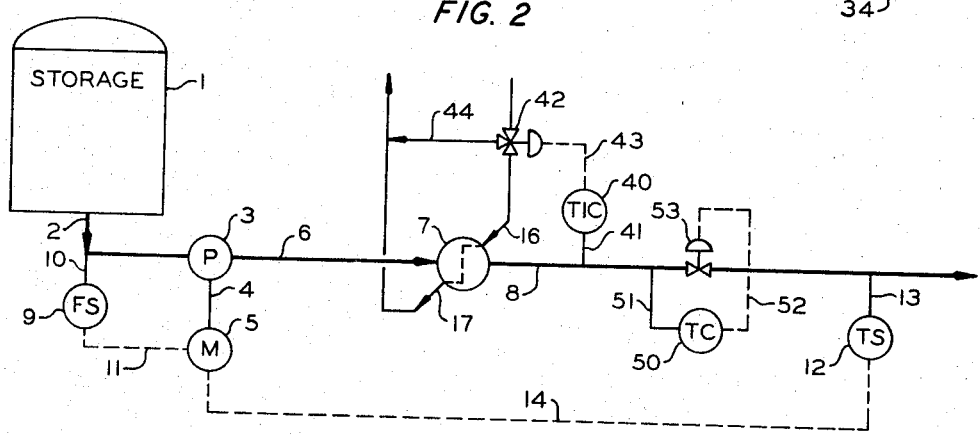
FIGURE 3 shows diagrammatically another system embodying an aspect of this invention.

In FIGURE 3 there is shown pump 3 which is controlled through motor 5 by either or both of flow sensor 9 and temperature sensor 12 in a manner described with reference to FIGURE 1 or 2, since although the embodiment of FIGURE 1 with reference to the place of flow sensor 9 is preferred, the embodiment in FIGURE 2 with reference to the placement of flow sensor 30 can also be employed. Similarly, the control of flow of heating fluid through heat exchanger 7 by 3-way motor valve 42 and temperature cotnroller 40 is similar to that discussed above with reference to FIGURE 2. In this embodiment, however, there is also added a temperature controller 50 which is operatively connected through conduit 51 to the interior of conduit 8 and through electrical conduit 52 to motor valve 53 which is mounted in conduit 8. In this embodiment of the invention, which is preferably employed for the high speed loading of tanker ships, temperature controller 40 is adjusted to bypass heating fluid from 16 to 17 through 55 when the temperature of the material in conduit 8 exceeds a predetermined maximum value. Temperature controller 40 is also adjusted to open valve 42 completely so that all the heating fluid passes into 16 and therefore heat exchanger 7 when the temperature of the material in conduit 8 falls below a predetermined minimum value. If the temperature of the material in conduit 8 continues to fall below the predetermined minimum value of temperature controller 40 this is sensed by temperature controller 50, which has a lower minimum temperature set point than temperature controller 40, and it will start to pinch down valve 53 to restrict the amount of material flowing through conduit 8. However, valve 53 is adjusted so that it not close completely but rather will stop when the flow of material in conduit 8 has reached a value of from about 25 to about 75 percent, preferably about 50 percent, of the normal flow rate of the material therein. If the temperature of the material in conduit 8 then continues to fall below the minimum set point temperature of temperature controller 50, temperature sensor 12, which has a lower minimum temperature set point than temperature controller 50, acts to terminate operation of motor 5 and therefore pump 3 to cease the unloading operation until the temperaure of the material in conduit 8 can be raised to a temperature of at least the set point of sensor 12.

The conduits 11, 13, 14, 33, 37, etc., and others not specifically identified are standard control type circuits and other conventional means and can be pneumatic, electric, hydraulic and the like as well as mixtures thereof.

*Example I*

Comercial propane is stored at −50° F. and removed therefrom by pump 3 at a discharge pressure of 175 p.s.i.g. Flow sensor 9 is set to stop motor 5 if the rate of flow of propane falls below 100 gallons per minute. Ethylene glycol heated to about 150° F., preferably no more than about 250° F., is pumped by pump 18 through heat exchanger 7 at a rate of 140 gallons per minute and a pressure of 15 p.s.i.g. The ethylene glycol exits from heat exchangers 7 through 17 at about 50° F. Flow sensor 22 is adjusted to terminate the operation of motor 5 if the flow rate of ethylene glycol through 17 falls below 110 gallons per minute. Propane passes from heat exchanger 7 into conduit 8 at a rate of 693 gallons per minute and a temperature of 20° F. Temperature sensor 12 is adjusted to terminate the operation of motor 5 if the temperature of the propane in conduit 8 falls below 20° F.

*Example II*

Commercial propane at −50° F. is removed from storage zone 1 by pump 3 and is discharged from pump 3 at a pressure of 160 p.s.i.g. Flow sensing means 30 is adjusted to terminate operation of motor 5 if the flow rate in conduit 6 falls below 25 gallons per minute. A 60 weight percent aqueous ethylene glycol solution at 150° F. is passed through heat exchanger 7 at 35 gallons per minute and exits therefrom at a temperature of about 50° F. Propane exits from heat exchanger 7 into conduit 8 at a temperature of about 32° F. at 129 gallons per minute. Temperature sensor 12 is adjusted to terminate the operation of motor 5 if the temperature of the propane in conduit 8 falls below 30° F. Pressure sensor 35 is adjusted to terminate operation of motor 38 if the pressure in 6 falls below 150 p.s.i.g. Temperature controller 40 is adjusted to start bypassing the glycol solution from 16 into 17 by way of 44 when the temperature of the propane in 8 exceeds about 32° F.

*Example III*

Commercial propane is stored at −50° F. and removed therefrom by pump 3 at a discharge pressure of 175 p.s.i.g. Flow sensor 9 is set to stop motor 5 if the rate of flow of propane falls below 50 gallons per minute. Ethylene glycol heated to about 120° F., preferably no more than about 250° F., is pumped through heat exchanger 7 at a rate of 140 gallons per minute and at a pressure of 15 p.s.i.g. The ethylene glycol exits from heat exchanger 7 at about 50° F. Propane passes from heat exchanger 7 to conduit 8 at a rate of 693 gallons per minute and at a temperature of about 20° F. Temperature controller 40 is set to start bypassing ethylene glycol solution from 16 to 17 through 44 when the temperature of the propane in 8 starts to exceed about 20° F. and is also set to open valve 42 so that all the ethylene glycol solution passes into conduit 16 if the temperature of the propane in 8 falls below about 20° F. Temperature controller 50 is set to normally keep motor valve 53 in a partially open position at about 20° F. and to start closing that motor valve when the temperature of the propane in 8 falls below 20° F. Motor valve 53 is adjusted so that it will close no further than that amount required to reduce the flow of propane through 8 to about 50 percent of its normal value and temperature controller 50 is set so that the 50 percent minimum pinch down of valve 53 is reached at a temperature slightly above 10° F., preferably about 12° F. Temperature sensor 12 has a set point of 10° F. so that if the propane in 8 reaches 10° F. operation of motor 5 is terminated.

Reasonable variations and modifications are possible within the scope of this disclosure without departing from the spirit and scope thereof.

What is claimed is:

1. A method for controlling the temperature of a fluid removed from a source thereof comprising removing said fluid from said source by and through a pumping zone, passing said fluid from said pumping zone through a heat exchange zone, sensing the temperature of said fluid after passing same through said heat exchange zone, at least reducing the rate of removal of said fluid from said source in response to a sensed temperature below a predetermined minimum value, sensing the rate of flow of said fluid from said source at at least one of upstream and downstream points of said pumping zone, and at least reducing the rate of removal of said fluid from said source in response to a sensed flow rate below a predetermined minimum value.

2. The method according to claim 1 wherein said rate of flow sensing is conducted upstream of said pumping zone.

3. The method according to claim 1 wherein said rate of flow sensing is conducted downstream of said pumping zone.

4. A method for controlling the temperature of a liquefied gas removed from a source thereof comprising removing said liquefied gas from said source by and passing same through a pumping zone, passing said liquefied gas from said pumping zone through a heat exchange zone, sensing the temperature of said liquefied gas after passing through said heat exchange zone, at least reducing the rate of removal of said liquefied gas from said source in response to a sensed temperature below a predetermined minimum value, sensing the rate of flow of said liquefied gas from said source downstream from said pumping zone and upstream from said heat exchange zone, at least reducing the rate of removal of said liquefied gas from said source in response to a sensed flow rate below a predetermined minimum value, passing a heating medium through said heat exchange zone by a second pumping zone upstream of said heat exchange zone, interlocking the drive means of the heating medium pumping means and the liquefied gas pumping means so that said heating medium pumping means must be started into operation prior to said liquefied gas pumping means, sensing the flow rate of said heating medium from said heat exchange zone, and in response to a sensed flow rate below a predetermined minimum value, at least reducing the rate of removal of said liquefied gas from said source.

5. A method for controlling the temperature of the liquefied gas removed from a source thereof comprising removing said liquefied gas from said source by passing same through a pumping zone, passing said liquefied gas from said pumping zone through a heat exchange zone, sensing the temperature of the said liquefied gas after passing through said heat exchange zone, at least reducing the rate of removal of said liquefied gas from said source in response to a sensed temperature below a predetermined minimum value, sensing the rate of flow of said liquefied gas from said source downstream from said pumping zone and upstream from said heat exchange zone, at least reducing the rate of removal of said liquefied gas from said source in response to a sensed flow rate below a predetermined minimum value, sensing the pressure of said liquefied gas downstream from said pumping zone and upstream from said heat exchange zone, at least reducing the rate of removal of said liquefied gas from said source in response to a sensed presure below a predetermined minimum value, passing the heating fluid through said heat exchange zone, sensing the temperature of said liquefied gas downstream from said heat exchange zone and varying the amount of heating medium passed to said heat exchange zone in response to a sensed temperature which exceeds a predetermined maximum value by bypassing at least part of said heating medium from that heating medium which is passing into said heat exchange zone to that heating medium which is passing from said heat exchange zone.

6. A method for controlling the temperature of a liquefied gas removed from a source thereof comprising removing said liquefied gas from said source and passing same through a pumping zone, passing said liquefied gas from said pumping zone through a heat exchange zone, sensing the temperature of said liquefied gas after passing through said heat exchange zone, at least reducing the rate of removal of said liquefied gas from said source in response to a sensed temperature below a predetermined minimum value, sensing the rate of flow of said liquefied gas from said source upstream from said heat exchange zone, at least reducing the rate of removal of said liquefied gas from said source in response to a sensed flow rate below a predetermined minimum value, separately sensing the temperature of said liquefied gas after passing through said heat exchange zone and upstream from other temperature sensing means mentioned hereinabove, no more than partially reducing the rate of removal of said liquefied gas from said source in response to a sensed temperature below a predetermined minimum value which is above said predetermined minimum value described hereinabove relative to other temperature sensing means downstream from said heat exchange zone, passing heating medium through said heat exchange zone, controlling the rate of flow of said heating medium through said heat exchange zone by sensing the temperature of said liquefied gas downstream from said heat exchange zone but upstream of other temperature sensing means mentioned hereinabove, and bypassing at least part of said heating medium from that heating medium which is passing into said heat exchange zone to that heating medium which is passing from said heat exchange zone when the sensed temperature falls below a predetermined value which minimum value is above any other predetermined temperature minimum value mentioned hereinabove.

7. The method according to claim 6 wherein said liquefied gas is propane.

8. Apparatus for controlling the temperature of a fluid removed from a source thereof comprising a storage means, a first pumping means, a heat exchange means, a first conduit openly connecting said storage means and said first pumping means, a second conduit openly connecting said first pumping means and said heat exchange means, a third conduit openly connected to said heat exchange means and said second conduit, a temperature sensing means operatively connected between said third conduit and said first pumping means and adapted to at least slow down said first pumping means, a flow sensing means operatively connected between said first conduit and said first pumping means and adapted to at least slow down said first pumping means, a heating medium inlet conduit openly connected to said heat exchange means, a second pumping means operatively connected to said heating medium inlet conduit, means for interlocking said second pumping means and said first pumping means in a manner to require starting of said second pumping means prior to starting of said first pumping means, heating medium outlet conduit openly connected to said heat exchange means, flow sensing means operatively connected to said heating medium outlet conduit and said first pumping means and adapted to at least slow down said first pumping means.

9. Apparatus for controlling the temperature of a fluid removed from a source thereof comprising a storage means, a first pumping means, a heat exchange means, a first conduit openly connecting said storage means and said pumping means, a second conduit openly connecting said first pumping means and said heat exchange means, a third conduit openly connected to said heat exchange means and said second conduit, a first temperature sensing means operatively connected between said third conduit and said first pumping means and adapted to stop said first pumping means, a flow sensing means operatively connected between at least one of said first and second conduits and said first pumping means and adapted to stop said first pumping means, a second pumping means operatively connected to said third conduit, a pressure sensing means operatively connected between said second conduit and said second pumping means and adapted to stop said second pumping means, an inlet conduit openly connected to said heat exchange means, an outlet conduit openly connected to said heat exchange means and said inlet conduit, a valve means operatively connected to said inlet conduit, a bypass conduit operatively connected between said valve means and said outlet conduit, a temperature sensing means operatively connected between said third conduit and said valve means and adapted to at least partially open said valve means to said bypass conduit in response to temperatures sensed in said third conduit.

10. Apparatus for controlling the temperature of a fluid removed from a source thereof comprising a storage means, a pumping means, a heat exchange means, a first conduit openly connecting said storage means and said pumping means, a second conduit openly connecting said pumping means and said heat exchange means, a third conduit openly connected to said heat exchange means and said second conduit, a temperature sensing means operatively connected between said third conduit and said pumping means and adapted to stop said pumping means, a flow sensing means operatively connected between said at least one of said first and second conduits and said pumping means and adapted to stop said pumping means, a valve means operatively connected to said third conduit upstream of said temperature sensing means, a temperature controller operatively connected to said valve means and to said third conduit upstream of said third valve means, an inlet conduit openly connected to said heat exchange means, an outlet conduit openly connected to said heat exchange means and said inlet conduit, a valve means operatively connected to said inlet conduit, a bypass conduit openly connected between said valve means in said inlet conduit and said outlet conduit, and a temperature control means operatively connected between said third conduit upstream of said valve means in said third conduit and said valve means in said inlet conduit.

References Cited
UNITED STATES PATENTS

| | | | |
|---|---|---|---|
| 2,922,289 | 1/1960 | Freeman | 62—55 X |
| 2,951,348 | 9/1960 | Loveday et al. | 62—55 X |
| 2,960,839 | 11/1960 | Hoag | 62—55 X |
| 2,976,695 | 3/1961 | Meade | 62—55 X |
| 3,210,953 | 10/1965 | Reed | 62—55 X |

LLOYD L. KING, *Primary Examiner.*